United States Patent Office 3,563,046
Patented Feb. 16, 1971

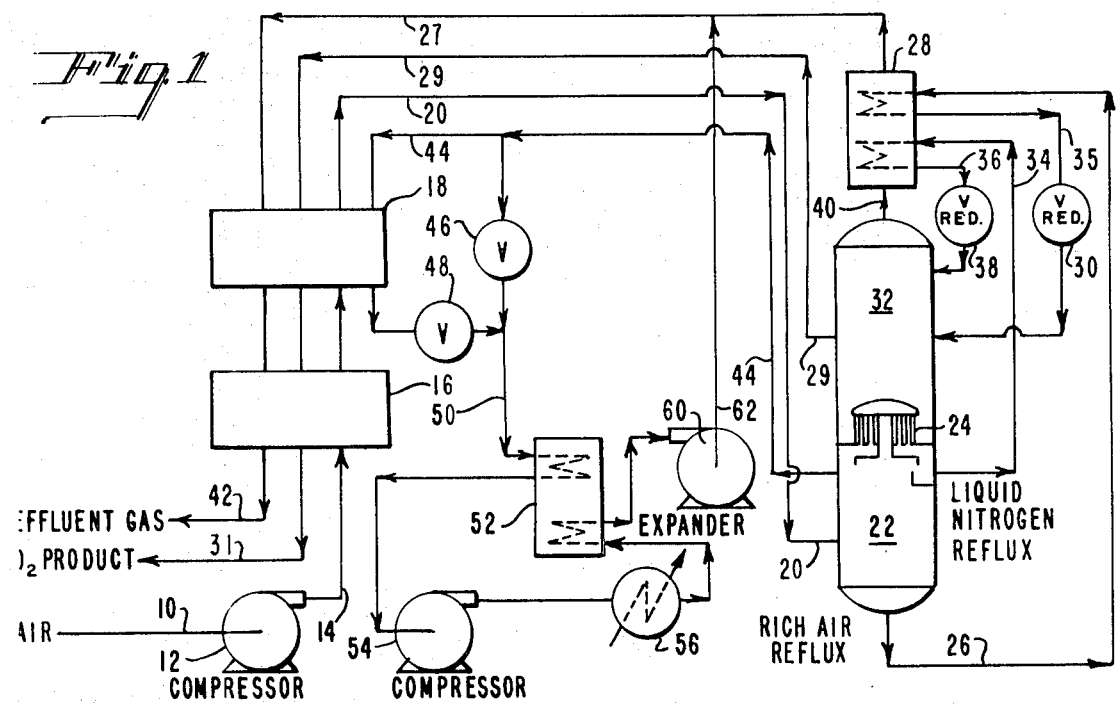
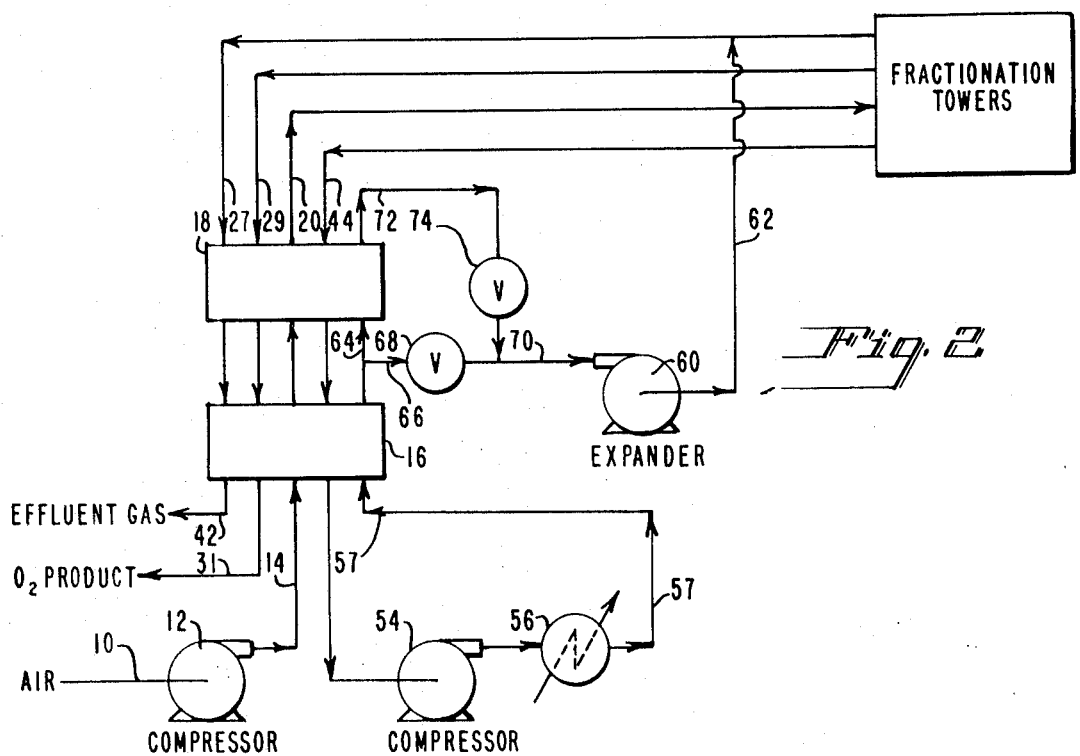

3,563,046
AIR SEPARATION PROCESS
Edward Harold Van Bausch, Pearl River, N.Y., assignor to Hydrocarbon Research, Inc., New York, N.Y., a corporation of New Jersey
Filed Jan. 5, 1968, Ser. No. 696,050
Int. Cl. F25j 3/02, 3/04, 5/00
U.S. Cl. 62—13   6 Claims

ABSTRACT OF THE DISCLOSURE

An improved air separation process wherein air is compressed, cooled by heat exchange with cold effluent gases from a low pressure distillation tower and then fractionated in a high pressure distillation tower, the condensation of the vapors from the high pressure tower being used to supply the heat to the low pressure tower and wherein refrigeration is obtained for the system by removing a vapor overhead stream from the high pressure tower, warming, compressing, removing the heat of compression, and subcooling the stream by heat exchange with the uncompressed portion of the stream and then passing the stream through an expander doing work.

BACKGROUND OF THE INVENTION

An air separation plant for the production of vaporous and liquefied atmospheric components usually consists of the essential steps of compressing and cooling an air feed and then fractionating the low temperature air to separate out the various components and then removing product effluents from the fractionation step. The fractionation step may consist of a single distillation tower or as is usually the practice, two distillation towers—one having a high pressure, i.e., several times that of atmospheric and the other having a low pressure, i.e., about the same as atmospheric. It has also been the practice to situate these high and low pressure distillation towers in such relationship to one another that the heat of vaporization of the vapors in the high pressure tower is transferred to the liquid contained in the low pressure tower, usually by use of a reboiler condenser. In air separation plants of this type, a cold vaporous effluent is removed from the low pressure distillation tower, is passed through reflux exchangers and reversing exchangers and is exhausted to the atmosphere, either as waste or as plant product. The pressure at the top of the low pressure tower is set by the pressure drop experienced by the effluent vapor in flowing to the atmosphere.

The pressure at the top of the high pressure tower, for a given liquid composition at the bottom of the low pressure tower and a given vapor composition at the top of the high pressure tower, is directly related to the pressure in the low pressure tower. This pressure is a function of the temperature difference ($\Delta T$) between the two towers within the reboiler condenser. As this temperature differential is increased, the pressure differential between the towers also increases. Usually for a particular plant, the temperature differential is essentially a constant.

The initial pressure to which the feed air must be compressed is usually referred to as "head pressure," and is that which is required to maintain the plant in proper operational balance. It is determined by the pressure drop inherent in the flow path of the air feed as it goes from the compressor to the bottom of the high pressure tower. This head pressure is an important factor in the design of a plant and represents a major economic factor in the design, not only from the point of view of initial cost, but also with respect to the utility requirements for the operation of the plant. It is desirable to have as low a head pressure as possible as long as it is consistent with the other plant design factors.

It is also typical in such plants to remove a vapor stream, usually but not necessarily nitrogen, from the high pressure tower and to expand this stream to supply or to supplement the entire refrigeration requirement needed to maintain the plant in proper refrigeration balance. A portion of this stream, prior to the expansion step, is used as an unbalance by passing it through a part of the reversing exchanger. The primary purpose of the unbalance stream is to add refrigeration to the incoming air so that the temperature of the $CO_2$ laydown approaches that of the waste gas stream used to remove the solid $CO_2$ on the reverse cycle. The remainder of the vapor overhead bypasses the reversing exchanger. The quantity of refrigeration available from operation of this expansion step, at a given outlet pressure and temperature, is a function of the inlet pressure which, in turn, is dependent on the pressure in the high pressure tower which as shown above, is, in turn, dependent on the temperature differential between the high and low pressure towers.

Thus, while it is desirable to decrease the differential temperature, to obtain a decreased pressure in the high pressure tower which, in turn, reduces the required head pressure with its resultant effects on plant economics, this decreased pressure has an adverse effect on the expansion step since it lowers the pressure at the inlet of the expander and, consequently, decreases the amount of refrigeration available from the expansion step.

Although methods by which a lower differential pressure across the high and low fractionation towers could be achieved have been known for some time, e.g., increased flow through the expander, the advantages that could be obtained by such methods were offset by the decreased refrigeration produced per unit flow of the unbalance stream expansion.

SUMMARY OF THE INVENTION

My invention consists of an improved method for increasing the efficiency of the refrigeration obtained from the vapor overhead stream taken from the high pressure distillation tower of the air separation plant.

More particularly, I have discovered a method, the use of which allows one to operate at a relatively low differential temperature, i.e., 2–3° F., with the resultant decreased head pressure requirement, without suffering the consequences of decreases expander inlet pressure on the expansion step.

I have found that if the vapor overhead stream from the high pressure tower is partially warmed to a temperature substantially less than ambient but substantially greater than that of the process by recombining the unbalance portion of the stream with the bypass portion of the vapor overhead, and the partially warmed stream is further warmed to ambient temperatures followed by compression, removal of the heat of compression and subcooling by heat exchange with the partially warmed stream, the pressure on the feed side of the expander may be sufficiently increased to produce a substantial improvement in the amount of refrigeration obtained by said expansion. In addition, my invention is of further advantage in that the expander may be allowed to do work in driving the compressor. In such compression, of course, it is required that the vapor overhead stream be brought to ambient temperature prior to compression. I have found that such warming may be accomplished either by a separate heat exchanger for the partially warmed overhead stream or by use of the existing warm section of the reversing cores. The important aspect of the warming to ambient temperature prior to compressing and the subcooling after removal of the heat of compression is that they are accomplished simultaneously by passing the partially warmed stream in heat exchanged with the cooled compressed stream.

Thus, I have discovered a method by which one may obtain substantial improvement in the amount of refrigeration obtained by expansion of the unbalanced stream from the high pressure fractionation tower, while still realizing the advantages of decreased head pressure requirements on the compressor.

DESCRIPTION OF THE DRAWING

FIG. 1 is a schematic flow diagram of an air separation plant.

FIG. 2 is a schematic flow diagram of a modified flow path for the overhead stream of FIG. 1.

PREFERRED EMBODIMENT OF THE INVENTION

As shown in FIG. 1, air at 10 is compressed in compressor 12 to about 90 p.s.i.a. It is then introduced through line 14 to reverse exchangers 16 and 18, wherein it is cooled to about −275° F. The cold air then proceeds to line 20 to high pressure tower 22 wherein the pressure is about 85 p.s.i.a. The vapors condensed in reboiler 24 and a rich air liquid consisting of about 38% oxygen is collected in the bottom of the high pressure tower. A rich air reflux is removed from the high pressure tower in line 26 and passed in the heat exchange with waste gas from the low pressure tower 32 in heat exchanger 28. The rich air reflux then passes through line 35 and reducing valve 30 into the low pressure tower. A liquid nitrogen reflux is removed from the high pressure tower in line 34 and is passed through heat exchanger 28 and then through line 36 to reducing valve 38, after which it is introduced to the low pressure tower. The pressure in tower 32 is about 19 p.s.i.a. A cold effluent gas, removed from the low pressure tower through line 40, is passed in heat exchange with both the rich air reflux and the liquid nitrogen reflux in heat exchanger 28 and then proceeds through reversing heat exchangers 16 and 18 after which it is vented as waste gas at 42.

A vapor oxygen stream is removed in line 29 from low pressure tower 32 through reversing exchangers 16 and 18 and is sent to distribution through line 31. A vapor overhead stream is removed from the high pressure tower 22 through line 44. The temperature of this stream is about −286° F. A portion of the stream is used as the unbalance and is passed through reverse heat exchanger 18 and then through valve 48 through line 50 to heat exchanger 52. The bypass portion is taken from line 44 through valve 46 into line 50 where it is recombined with the unbalance. The temperature of the stream in line 50 is about −173° F. The combined stream is then warmed to ambient temperature in heat exchanger 52. The stream is then compressed in compressor 54, cooled in after cooler 56 wherein the heat of compression is removed, and then passed through heat exchanger 52 again. The temperature of the stream at this time is about −168° F. The stream is then expanded in expander 60, where it undergoes substantial cooling and is then passed through line 62 into the cold effluent gas stream to add refrigeration to the air feed. The work done by expander 60 may be used to drive compressor 54 or may be used as an expander brake.

In a system using a separate heat exchanger as shown in FIG. 1, the normal mode would be to have the vapor overhead gas stream represent about 12% of the total feed to the system, and then to use about 10% as the unbalanced stream through reverse exchanger 18 and shunt the 2% bypass stream through line 46. The entire 12% flow would then be combined, passed through exchanger 52 to the compression stage and then to the expansion stage.

FIG. 2 shows a modification of FIG. 1 wherein the reversing exchanger 16 is used in place of a separate exchanger for the overhead vapor stream. In this modification, the unbalanced gas stream in line 44 would pass through exchangers 18, and 16 and then through compressor 54, after cooler 56 and then through line 57 back through exchanger 16. A major portion of this stream would then be shunted through line 66 with a minor portion going back through exchanger 18 so that the system may be maintained in temperature balance. The stream from exchanger 18 then goes through line 72 and is recombined with the shunted portion in line 70. Valves 68 and 74 are used to control the balance of the amount of the stream going through exchanger 18.

In the case wherein the vapor overhead stream represents about 12% of the total air feed to the plant, it would be normal to shunt 10% of the stream through line 66 and allow the remaining 2% to go through exchanger 18. The entire 12% would then be recombined in line 70, passed through expanded 60 and then through line 62 into the cold effluent gas stream. This second modification would be particularly useful in a smaller plant having only one or two reversing cores.

EXAMPLE I.—COMPARISON OF BOOSTED AND NON-BOOSTER EXPANDER FEED

[80% expander efficiency, 63% blower brake efficiency]

| | Non-boosted feed | Boosted feed |
|---|---|---|
| Expander inlet conditions: | | |
| Pressure, p.s.i.a. | 90 | 115 |
| Temperature, °F. | −191.3 | −168.2 |
| Expander outlet conditions: | | |
| Pressure, p.s.i.a. | 18 | 18 |
| Temperature, °F. | −273 | −267 |
| ΔH, B.t.u./mole | 530 | 639 |
| Refrigeration loss at warm end of exchanger equals. | 27 B.t.u./mole for T=5° F. | |
| Therefore, the refrigeration gain equals | 639−27−530 | |
| | 82 B.t.u./mole | | or $$\frac{82}{530} \times 100 = 15\% \text{ increase in refrigeration}$$

Example I illustrates the significant improvement that can be obtained in refrigeration using applicant's invention, assuming a minimum blower brake efficiency. Such an improvement in refrigeration efficiency would result in about a 3% decrease in the amount of air required at the plant inlet to produce a given amount of vapor and liquid.

Additional modifications to the above system are possible to increase the expander inlet pressure. For example, if an expander brake compressor is not used or if it is used but does not give the desired expander inlet pressure, an independently driven compressor may be utilized to supply part or all of the expander inlet pressure. Alternatively, an outside compressed vapor source at ambient temperature may be used to supplement the expander inlet pressure supplied by the compressed vapor overhead stream. A third modification would be to use an outside compressed vapor source at ambient temperature to supply all of the expander inlet pressure. In this case, the vapor overhead stream would be discharged as plant product.

Although the above example and discussion discloses a preferred mode of embodiment of applicant's invention, it is recognized that from such disclosure, many modifications will be obvious to those skilled in the art and it is understood, therefore, that applicant's invention is not limited to only those specific methods, steps or combination or sequence of method steps described, but covers all equivalent steps or methods that may fall within the scope of the appended claims.

I claim:

1. A cryogenic process for the liquefaction and separation of gaseous components of the atmosphere of the type wherein air is compressed, cooled by passing in heat exchange with cold effluent gases in reversing exchangers and then fractionated in a fractionator with high and low pressure zones, wherein the vaporous overhead from the low pressure zone is cooled by indirect heat exchange with the liquid bottoms and with the condensed overhead of the high pressure zone which are then separately valve expanded and introduced into the low pressure zone of the fractionator, said fractionator serving to produce vaporous and liquid effluents and wherein a vapor overhead stream is removed from the high pressure fractionation step, is partially warmed to a temperature substantially greater than the minimum process temperature, but substantially less than ambient is thereafter expanded through an expander and then used to supply refrigeration to the process by discharging through a reversing exchanger in heat exchange with incoming air, the improvement which comprises prior to the expansion step, the steps of (a) warming the partially warmed overhead stream to substantially ambient temperature,
(b) compressing said warmed stream,
(c) removing the heat of compression therefrom,
(d) subcooling the vapor overhead stream by passing it in heat exchange with the partially warmed uncompressed stream, and following the expansion step and the supply of refrigeration,
(e) discharging said stream from the reversing exchanger as effluent gas at substantially atmospheric conditions.

2. The process as claimed in claim 1 wherein the heat exchange for the subcooling step is accomplished within the existing reversing exchangers and wherein a first portion of the vapor overhead stream is used as an unbalance stream by removing it from an intermediate point in said heat exchange step and the remaining portion of the vapor overhead stream is passed completely through the heat exchange step and said first and remaining portions are then combined prior to the expansion step.

3. The process as claimed in claim 1 wherein the vapor overhead stream is partially warmed by passing a first portion of it in heat exchange with the incoming compressed air in the reversing exchanger and then combining this first portion with the remaining stream and wherein the combined, partially warmed stream is warmed to ambient by passing it in heat exchange with the compressed stream subsequent to removal of the heat of compression, in a heat exchanger other than the reversing exchanger.

4. The process as claimed in claim 1 wherein the magnitude of the vapor overhead stream is between about 8 to about 25 percent of the total air feed to the process.

5. The process as claimed in claim 1 wherein the differential temperature between steps (a) and (c) is about 5° F., the subcooled vapor overhead stream is expanded from about 115 p.s.i.a. to about 18 p.s.i.a. and the expansion cools the stream from about −168.2° F. to about −267° F., whereby a refrigeration increase of the system of about 15 percent is obtained.

6. The process as claimed in claim 1 wherein the vapor overhead stream is compressed to the desired expander inlet pressure with a compressor driven by the expander for the expansion step.

References Cited
UNITED STATES PATENTS

| | | | |
|---|---|---|---|
| 2,785,548 | 3/1957 | Becker | 62—26 |
| 3,173,778 | 3/1965 | Gaumer | 62—29 |
| 3,216,206 | 11/1965 | Kessler | 62—13 |
| 3,251,190 | 5/1966 | Seidel | 62—14 |

NORMAN YUDKOFF, Primary Examiner

A. F. PURCELL, Assistant Examiner

U.S. Cl. X.R.

62—29, 30, 39